(12) United States Patent
Cho et al.

(10) Patent No.: US 12,527,972 B2
(45) Date of Patent: Jan. 20, 2026

(54) BEAM SHAPING DEVICE FOR BORON NEUTRON CAPTURE THERAPY APPARATUS, AND BORON NEUTRON CAPTURE THERAPY APPARATUS COMPRISING SAME

(71) Applicant: KOREA INSTITUTE OF RADIOLOGICAL & MEDICAL SCIENCES, Seoul (KR)

(72) Inventors: Il Seong Cho, Seoul (KR); Bong Hwan Hong, Seoul (KR); Cha Won Park, Hwaseong-si (KR); Sun Hong Min, Seoul (KR); Min Ho Kim, Seoul (KR); Won Taek Hwang, Namyangju-si (KR); Kyeong Min Kim, Seoul (KR); Seung Woo Park, Seoul (KR)

(73) Assignee: KOREA INSTITUTE OF RADIOLOGICAL & MEDICAL SCIENCES, Seoul (KR)

( * ) Notice: Subject to any disclaimer, the term of this patent is extended or adjusted under 35 U.S.C. 154(b) by 338 days.

(21) Appl. No.: 18/254,793

(22) PCT Filed: Nov. 26, 2021

(86) PCT No.: PCT/KR2021/017573
§ 371 (c)(1),
(2) Date: May 26, 2023

(87) PCT Pub. No.: WO2022/114829
PCT Pub. Date: Jun. 2, 2022

(65) Prior Publication Data
US 2023/0405360 A1 Dec. 21, 2023

(30) Foreign Application Priority Data

Nov. 30, 2020 (KR) .................. 10-2020-0164563

(51) Int. Cl.
*A61N 5/10* (2006.01)

(52) U.S. Cl.
CPC ...... *A61N 5/1045* (2013.01); *A61N 2005/109* (2013.01); *A61N 2005/1094* (2013.01); *A61N 2005/1095* (2013.01)

(58) Field of Classification Search
CPC ................ A61N 5/10; A61N 2005/109; A61N 2005/1094; A61N 2005/1095;
(Continued)

(56) References Cited

U.S. PATENT DOCUMENTS 3,781,564 A * 12/1973 Lundberg ................. G21K 1/02
976/DIG. 428
4,192,998 A * 3/1980 Azam ...................... H05H 6/00
976/DIG. 428
(Continued)

FOREIGN PATENT DOCUMENTS

CN 108543233 A 9/2018
CN 109173083 A 1/2019
(Continued)

OTHER PUBLICATIONS

M. Marek et al., "Optimization of the BNCT Filter", Journal of Nuclear Science and Technology, Supplement, Mar. 1, 2000.

*Primary Examiner* — Wyatt A Stoffa

(57) ABSTRACT

The present invention relates to a beam shaping device for a boron neutron capture therapy apparatus and the boron neutron capture therapy apparatus comprising same allowing a user to select the number of filter modules in advance before neutron generation and arrange same. According to the present invention, it is possible to improve a therapeutic effect and minimize side effects during boron neutron capture therapy.

17 Claims, 14 Drawing Sheets

(58) Field of Classification Search
CPC .... A61N 2005/1096; G21K 5/10; G21K 5/04;
G21K 5/08
See application file for complete search history.

(56) References Cited

U.S. PATENT DOCUMENTS

| | | | | |
|---|---|---|---|---|
| 5,920,601 | A * | 7/1999 | Nigg | G21K 5/04 376/158 |
| 6,674,829 | B1 * | 1/2004 | Skold | A61N 5/10 376/346 |
| 9,789,340 | B2 * | 10/2017 | Liu | A61N 5/1077 |
| 10,124,192 | B2 | 11/2018 | Liu et al. | |
| 11,109,476 | B2 * | 8/2021 | Hsueh Liu | H05H 7/001 |
| 11,198,023 | B2 * | 12/2021 | Chen | G21K 5/04 |
| 11,266,859 | B2 * | 3/2022 | Liu | H05H 3/06 |
| 11,986,676 | B2 * | 5/2024 | Park | A61N 5/1065 |
| 11,986,680 | B2 * | 5/2024 | Tsai | G21K 1/025 |
| 2015/0105604 | A1 * | 4/2015 | Liu | A61N 5/1077 600/1 |
| 2017/0329028 | A1 * | 11/2017 | Kunimoto | A61N 5/1075 |
| 2018/0160521 | A1 * | 6/2018 | Hsueh Liu | H05H 7/001 |
| 2018/0193673 | A1 * | 7/2018 | Liu | A61N 5/1081 |

FOREIGN PATENT DOCUMENTS

| | | |
|---|---|---|
| CN | 111420307 A | 7/2020 |
| CN | 111821581 A | 10/2020 |
| JP | 2007-240330 A | 9/2007 |
| JP | 2014-115122 A | 6/2014 |
| JP | 2018-198136 A | 12/2018 |
| JP | 2018-535717 A | 12/2018 |
| JP | 2020-130573 A | 8/2020 |
| KR | 10-2001-0095996 A | 11/2001 |
| KR | 10-2009-0092713 A | 9/2009 |
| TW | 201836613 A | 10/2018 |

* cited by examiner

Prior Art

Prior Art

BEAM SHAPING DEVICE FOR BORON NEUTRON CAPTURE THERAPY APPARATUS, AND BORON NEUTRON CAPTURE THERAPY APPARATUS COMPRISING SAME

CROSS REFERENCE TO RELATED APPLICATIONS

The present application is a National Phase of International Application No. PCT/KR2021/017573 filed on Nov. 26, 2021, which claims the priority based on Korean Patent Application No. 10-2020-0164563 filed on Nov. 30, 2020, and the entire contents disclosed in the description and drawings of the corresponding applications are referenced in the present application.

TECHNICAL FIELD

The disclosure relates to a beam shaping device for a boron neutron capture therapy apparatus, and a boron neutron capture therapy apparatus including the same, and more particularly to a beam shaping device for a boron neutron capture therapy apparatus, which is configured to selectively control the energy of neutrons, and a boron neutron capture therapy apparatus including the same.

BACKGROUND ART

Boron neutron capture therapy refers to a treatment modality that accumulates boron in cancer cells by injecting a material containing boron in advance, irradiates neutrons to cause nuclear fission in the cancer cells, and kills the cancer cells as particles are released by the nuclear fission. The boron neutron capture therapy is known to be representatively effective against brain tumors, head and neck cancer, skin cancer, etc., and is spotlighted as the next-generation cancer treatment modality in that side effects from radiation exposure of normal cells are minimized as compared with a conventional radiation therapy.

The neutrons generated by a boron neutron capture therapy apparatus are classified according to energy into fast neutrons having an energy of 10 keV or more, epithermal neutrons having an energy of 0.5 eV to 10 keV, and thermal neutrons having an energy of 0.5 eV or less. Among them, the fast neutrons having high permeability cause radioactive side effects in tissues around the tumor, and the thermal neutrons having a low energy cause radioactive side effects in skin. Therefore, the fast and thermal neutrons are known to be unsuitable for therapeutic purposes.

Regarding the boron neutron capture therapy apparatus, U.S. Pat. No. 10,124,192 has been disclosed. However, such a related art has a problem in that the epithermal neutrons having an energy of 0.5 eV to 30 keV, which are clinically excellent in therapeutic effect, are not efficiently secured.

Disclosure

Technical Problem

An aspect of the disclosure is to provide a beam shaping device and a boron neutron capture therapy apparatus including the same, which can solve the problem of a conventional boron neutron capture therapy, i.e., can maximize the securing of epithermal neutrons.

Technical Solution

According to an embodiment of the disclosure, there is provided a beam shaping device for a boron neutron capture therapy apparatus including: a shielding housing including a space formed on a traveling path of a neutron beam; a target provided at a front side of the shielding housing, and configured to be irradiated with a particle beam passed through an accelerator; a collimator provided at a rear side of the shielding housing, and configured to adjust a region through which the neutron beam passes; and a plurality of filter modules inserted in the space and configured to decrease the energy of the neutron beam, wherein the plurality of filter modules, the number of which is selected by a user, are inserted in the shielding housing.

Meanwhile, the filter module may be disposed in a direction orthogonal to a direction in which the neutron beam passes, and the plurality of filter modules may be arranged along the direction in which the neutron beam passes, and disposed in parallel with each other.

Further, each filter module may include a moderator and a fast neutron filter, and the moderator and the fast neutron filter may be positioned alternately along the traveling path of the neutron beam.

Further, the filter module may be shaped like a plate.

Meanwhile, the filter module may include the moderator shaped like a plate, and the fast neutron filter formed to surround the moderator.

The number of filter modules to be inserted in the shielding housing may be selected so that neutrons passed through the collimator can have energy ranging from 0.5 eV to 30 keV.

Meanwhile, the moderator may contain AlF3.

Meanwhile, the fast neutron filter may contain aluminum (Al).

Meanwhile, the beam shaping device may further include a door provided at one side of the shielding housing, and opened and closed so that the filter module can be inserted in the space.

Meanwhile, the door and the shielding housing may include stepped portions formed in portions to be in close contact with each other and configured to block the neutrons generated therein.

Meanwhile, the shielding housing may include a guide provided at a side of the space in a direction orthogonal to a direction in which the neutron beam passes, and the filter module may be inserted in the space along the guide.

Further, the filter module and the guide may include stepped portions formed in portions to be in contact with each other.

Meanwhile, the target may be fixed to the outside, and the shielding housing may be movable relative to the target.

In addition, the shielding housing may be straightly movable frontwards and rearwards.

Further, the target may be configured to at least partially enter the shielding housing, and a distance the target enters the shielding housing may be determined as a horizontal moving distance of the shielding housing is adjusted according to the number of filter modules inserted in the space.

Meanwhile, a position of the shielding housing may be moved and determined so that an end portion of the target can be in contact with the frontmost filter module among the plurality of filter modules inserted in the space.

Further, the shielding housing may be configured to move together with an external therapy table configured to support a patient.

According to an another embodiment, there is provided a boron neutron capture therapy apparatus including: an accelerator configured to accelerate a particle beam; a target configured to be irradiated with the particle beam accelerated in the accelerator and release neutrons; a beam shaping device configured to change the properties of the neutrons; and a therapy table configured to support a patient so that the patient can be positioned to be irradiated with the neutrons passed through the beam shaping device, wherein the beam shaping device including: a shielding housing including a space formed on a traveling path of the neutron beam; a target provided at a front side of the shielding housing, and configured to be irradiated with a particle beam passed through an accelerator; a collimator provided at a rear side of the shielding housing, and configured to adjust a region through which the neutron beam passes; and a plurality of filter modules inserted in the space and configured to decrease the energy of the neutron beam, wherein the plurality of filter modules, the number of which is selected by a user, are inserted in the shielding housing.

Meanwhile, the filter module may be disposed in a direction orthogonal to a direction in which the neutron beam passes, and the plurality of filter modules may be arranged along the direction in which the neutron beam passes, and disposed in parallel with each other.

Meanwhile, each filter module may include a moderator and a fast neutron filter, and the moderator and the fast neutron filter may be placed alternately along the traveling path of the neutron beam.

Advantageous Effects

In the beam shaping device for the boron neutron capture therapy apparatus according to the disclosure, and the boron neutron capture therapy apparatus including the same, the filter modules, the number of which is selected by a user in advance, are disposed before generating the neutrons to maximize the securing of epithermal neutrons, thereby improving a therapeutic effect and minimizing side effects during the boron neutron capture therapy

MODE FOR INVENTION

Figure 1:
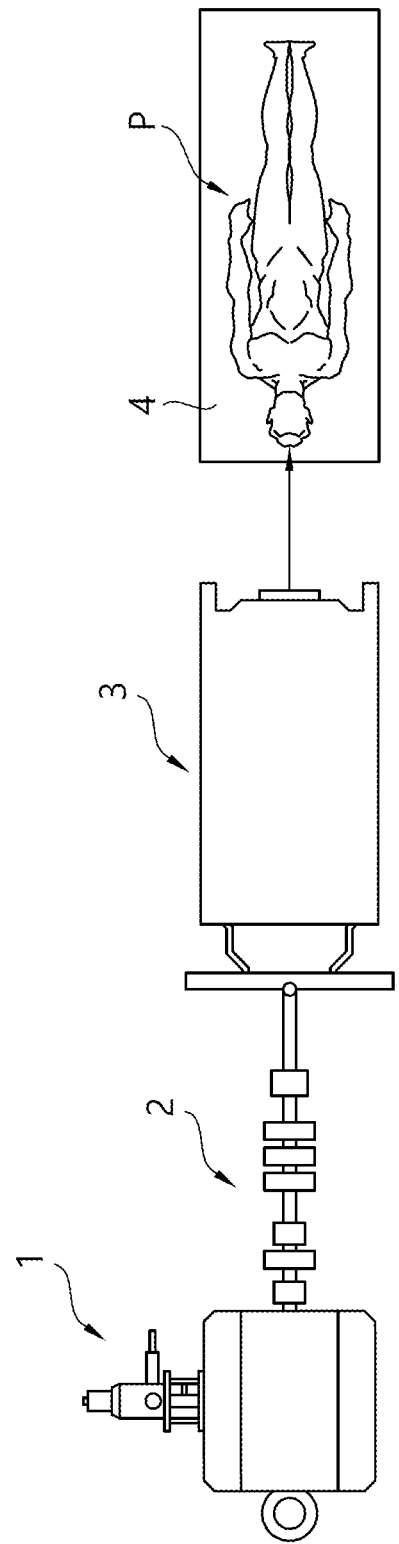
FIG. 1 is a conceptual view of a conventional boron neutron capture therapy apparatus.

Hereinafter, a beam shaping device for a boron neutron capture therapy apparatus, and a boron neutron capture therapy apparatus including the same according to embodiments of the disclosure will be described in detail with reference to the accompanying drawings. Elements described in embodiments set forth herein may be called other names in the art. However, if the elements are similar or identical in terms of their functions, they may be regarded as equivalents even in alternative embodiments. Further, symbols assigned to the elements are given for convenience of description. However, content on the drawings with these given signs do not limit the elements to a range in the drawings. Likewise, even though the elements on the drawings are partially modified according to alternative embodiments, they having functional similarity and identity may be regarded as equivalents. Further, if those skilled in the art recognizes natural involvement of elements, descriptions of the elements will be omitted.

Hereinafter, the terms 'front' and 'rear' will be used in describing directions. Descriptions will be made by defining the front as a direction in which a beam shaping device faces toward an accelerator, and the rear as a direction in which the beam shaping device faces toward a patient that neutrons finally reach. According to the assumed directions, neutrons are irradiated from a front side to the beam shaping device, and move out toward a rear side while passing through the beam shaping device.

Below, a boron neutron capture therapy apparatus and a therapy principle according to the related art will be described with reference to FIGS. 1 to 3.

FIG. 1 is a conceptual view of a conventional boron neutron capture therapy apparatus.

As shown therein, a neutron generator for generating neutrons in a conventional boron neutron capture therapy includes a particle accelerator 1 and an electrostatic accelerator 2 accelerating a proton beam emitted from the particle accelerator 1, such as a cyclotron and a target 200 placed on a beam path of the proton beam and releasing neutrons therefrom when colliding with the beam.

The neutrons released from the target 200 may be classified into fast neutrons having an energy of 10 keV or more, epithermal neutrons having an energy of 0.5 eV to 10 keV, and thermal neutrons having an energy of 0.5 eV or less. To moderate the fast neutrons into the epithermal neutrons suitable for therapy, a beam shaping device 3 is provided.

A neutron beam passed through the beam shaping device 3 passes through a desired region, and finally irradiated to an affected area of a patient P, thereby causing a nuclear reaction.

Figure 2:
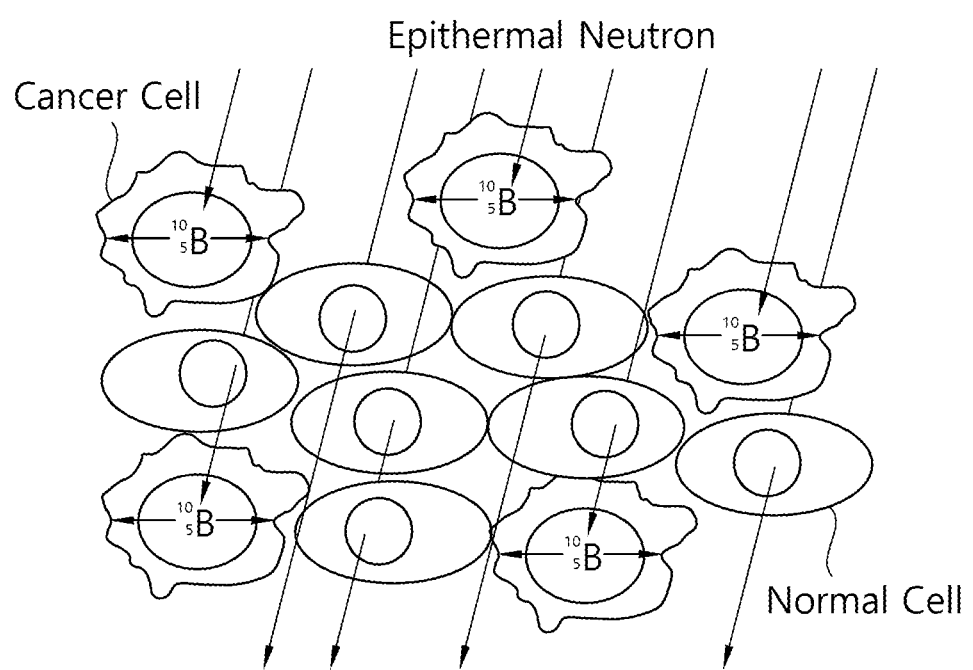
FIG. 2 is a view showing the concept of a boron neutron capture therapy.

FIG. 2 is a view showing the concept of a boron neutron capture therapy.

Referring to FIG. 2, neutrons irradiated to an affected area of a patient P have a nuclear reaction with boron accumulated in cancer cells and destroy the cancer cells. On the other hand, normal cells do not have a meaningful nuclear reaction because boron is not accumulated therein.

Figure 3:
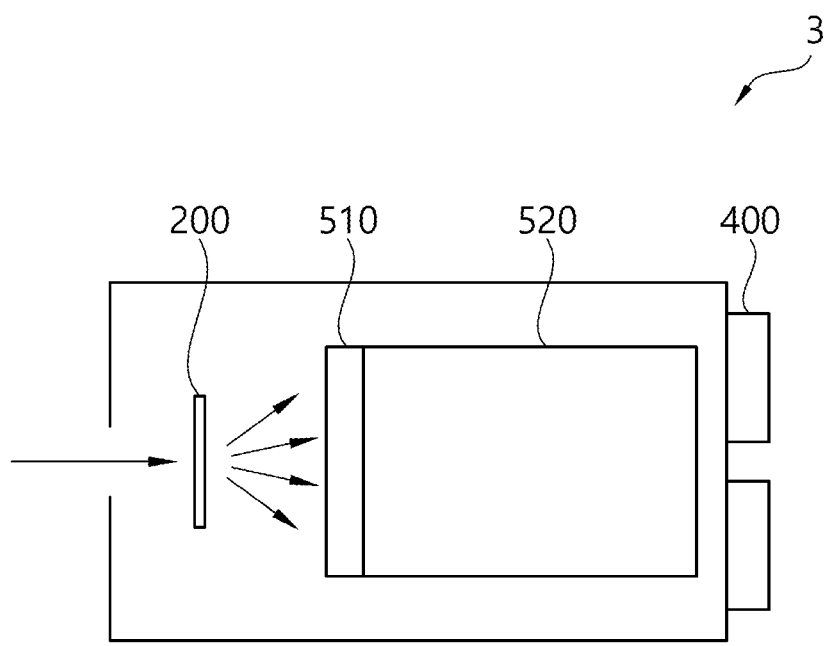
FIG. 3 is a conceptual view of a beam shaping device for a conventional boron neutron capture therapy apparatus.

FIG. 3 is a conceptual view of the beam shaping device 3 for a conventional boron neutron capture therapy apparatus.

Referring to FIG. 3, the conventional beam shaping device 3 generates the neutrons and gamma ray(y) from the target 200 which placed being biased toward the front side inside the beam shaping device 3. At this time, the neutrons travel toward the rear side at various angles. Inside the beam shaping device 3, the neutrons first pass through a fast neutron filter 510, then pass through a moderator 520, and finally pass through the collimator 400. In this way, the conventional beam shaping device 3 includes the fast neutron filter 510 as one block, and the moderator 520 another block.

Below, a boron neutron capture therapy apparatus according to the disclosure will be described in detail with reference to FIGS. 4 to 14.

Figure 4:
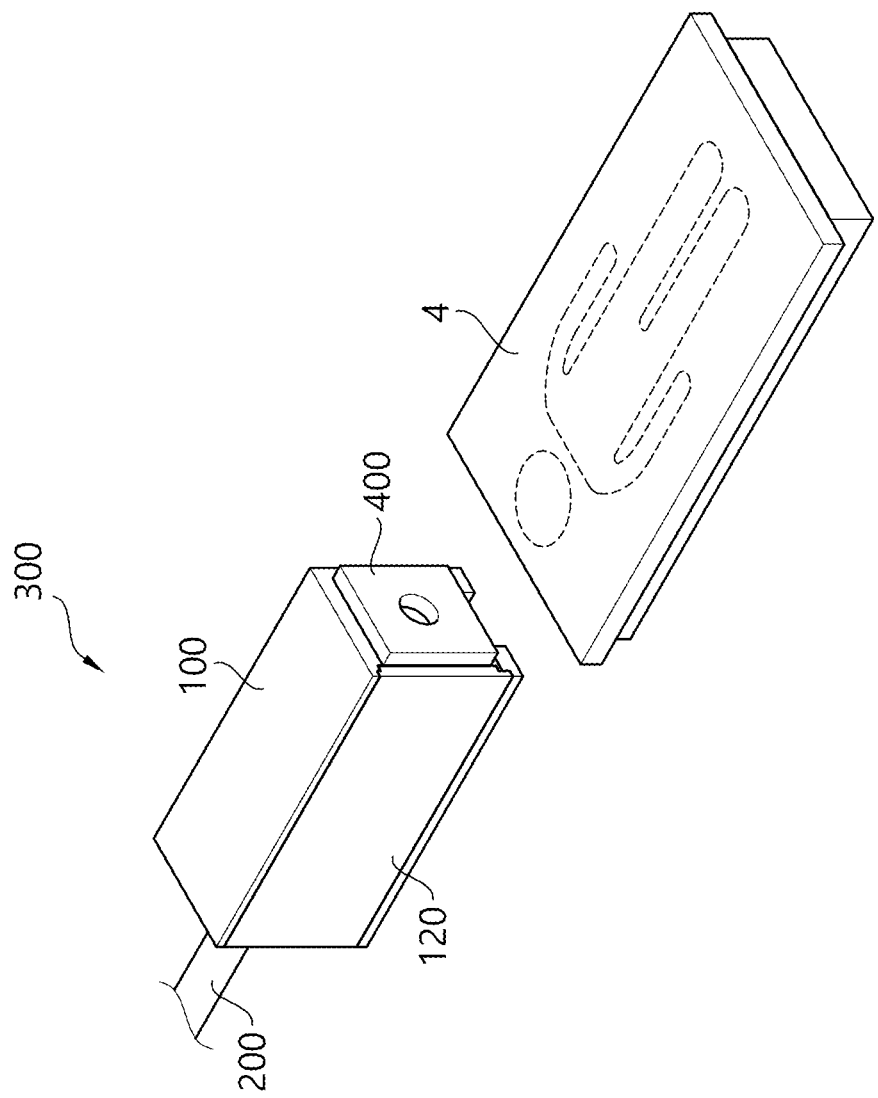
FIG. 4 is a perspective view of a boron neutron capture therapy apparatus according to an embodiment of the disclosure.

FIG. 4 is a perspective view of a boron neutron capture therapy apparatus according to an embodiment of the disclosure.

Referring to FIG. 4, the boron neutron capture therapy apparatus according to the disclosure may include an accelerator, a target 200, a beam shaping device 300, and a therapy table 4.

The accelerator is configured to accelerate a particle beam, and may for example employ a linear particle accelerator (or a linear accelerator). An electrostatic accelerator 200 is internally vacuumized to minimize interference with other atoms during the acceleration of the particle beam. However, this structure has been widely used, and thus detailed descriptions thereof will be omitted.

The target 200 may be irradiated with the particle beam, and radiation including the neutrons may be released after the irradiation. As an example of the target 200 for releasing the neutrons, the target 200 may be provided containing beryllium. The target 200 may have one side connected to the foregoing particle accelerator 1 in a vacuum atmosphere, and the other side exposed to air. The other side of the target 200 is in close contact with a filter module 500 (to be described later) and configured to minimize the loss of released neutrons.

The beam shaping device 3 is configured to control the energy of neutrons released from the target 200. The beam shaping device 3 may be provided in the rear of the target 200, be configured to reduce the energy of neutrons released from the target 200, and be provided with a shielding housing 100 surrounding the traveling path of the neutrons to prevent the neutrons from being irradiated to other areas than an affected area of a patient P. The beam shaping device 3 may include a plurality of filter modules 500 provided therein, and a collimator 400 provided at the rear side.

The plurality of filter modules 500 is configured to reduce the energy of neutrons. Meanwhile, the beam shaping device 3 may be configured to be adjusted in a horizontal position. The horizontal position of the beam shaping device 3 may be adjusted according to the number of filter modules 500 (to be described later). To this end, the beam shaping device 3 may be slidably connected to a lower frame. In this regard, details will be described later.

The collimator 400 is configured to determine a region to be irradiated with the neutron beam on the path where the neutrons travel from the beam shaping device 3. The collimator 400 includes an opening, the shape and size of which are adjustable according to predetermined target where cancer tissues and normal tissues are located, thereby minimizing the exposure of the normal tissues to radiation. Meanwhile, the collimator 400 may employ various conventional collimators, such as a multi-leaf collimator 400, and thus detailed descriptions thereof will be omitted.

The therapy table 4 may be configured to support a patient P, i.e., configured to stably fix the position of the patient P during the therapy. Because the therapy table 4 has a fixed direction in which the neutron beam is irradiated, the position of the patient P may be adjusted as moved relative to the therapy table 4 so that a lesion area of the patient P can be irradiated with the neutron bean. Further, a distance between the therapy table 4 and the beam shaping device 3 may be adjusted to exhibit an optimal therapeutic effect. Meanwhile, the foregoing adjustment in a relative position between the beam shaping device 3 and the target 200 may lead to adjustment in a relative position between the therapy table 4 and the target 200. In this regard, details will be described later.

Below, the configuration and function of the beam shaping device 3 according to another embodiment of the disclosure will be described in detail.

Figure 5:
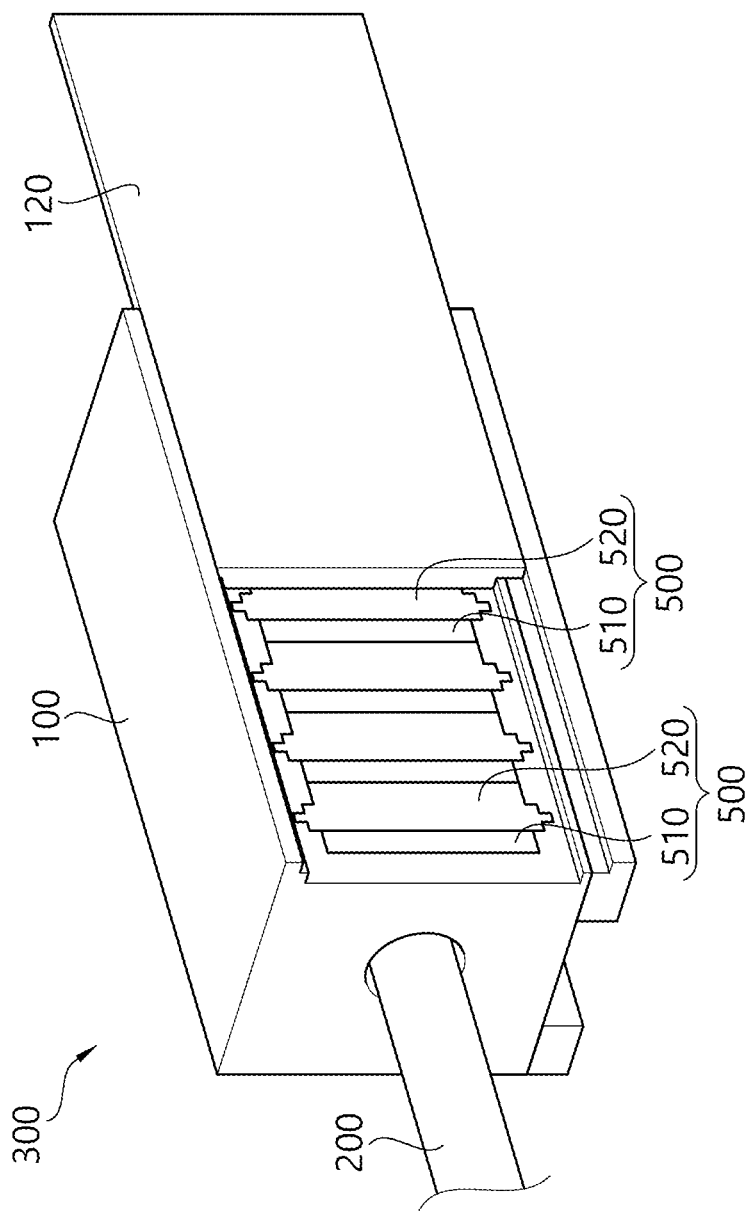
FIG. 5 is a perspective view of a beam shaping device.
Figure 6:
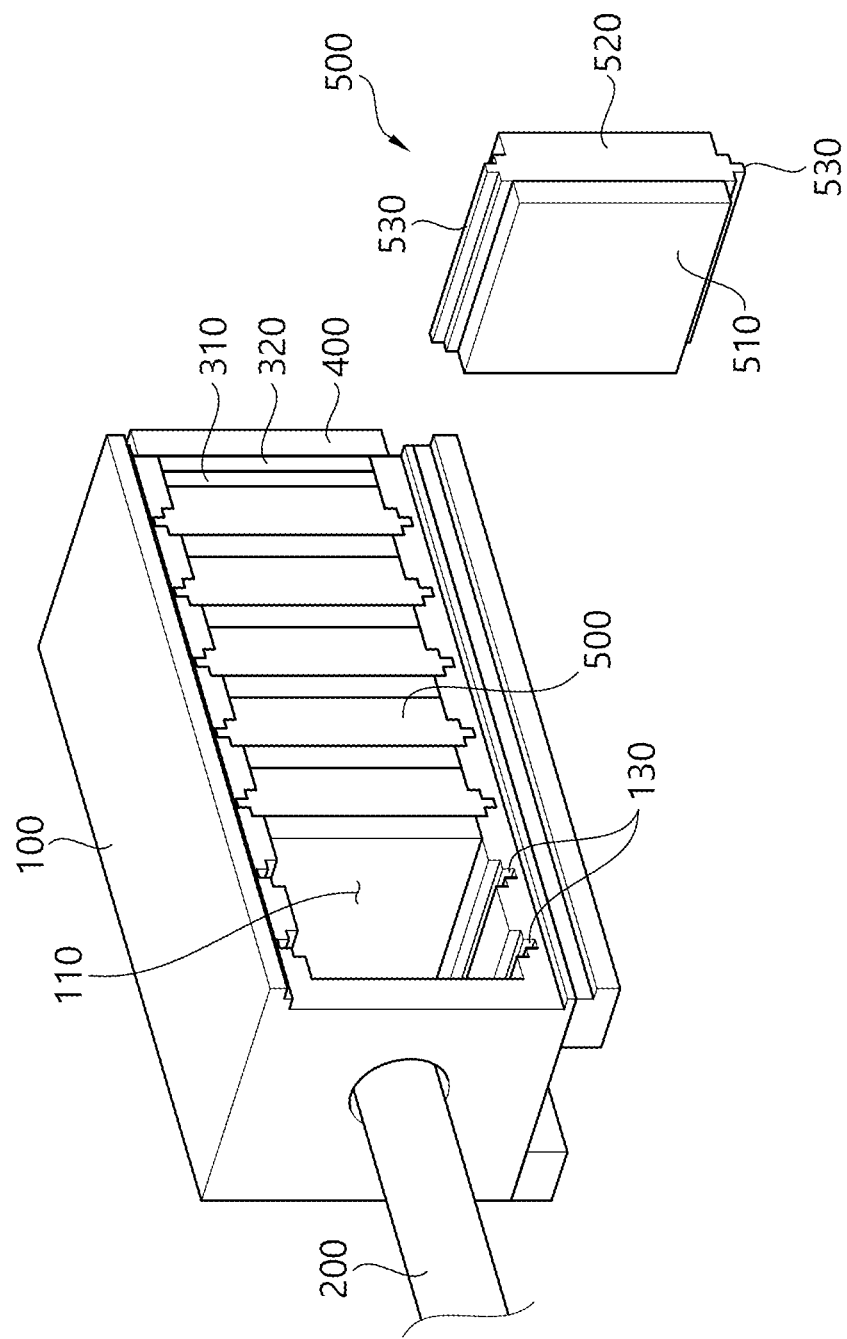
FIG. 6 is a view showing a state that a door is removed from a beam shaping device.

FIG. 5 is a perspective view of the beam shaping device 3, and FIG. 6 is a view showing a state that a door is removed from the beam shaping device 3.

Referring to FIG. 5, the beam shaping device 3 is configured to allow the target 200 to be inserted therein from the front side, and includes the plurality of filter modules 500 on the path of the neutrons so as to adjust the energy of the neutron beam. Further, the collimator 400 is provided to adjust a region to which the neutron beam passed through the plurality of filter modules 500 is irradiated.

The beam shaping device 3 may include the shielding housing 100, a door 120, and the plurality of filter modules 500.

The shielding housing 100 may be formed to surround the path of the neutron beam, and configured to prevent radiation such as the neutrons generated therein and gamma rays generated due to a reaction between the neutrons and the filter from leaking to the outside. The shielding housing 100 may be made of a material having a high shielding rate to shield the radiation. The shielding housing may contain at least one material of iron (Fe) and lead (Pb).

The shielding housing 100 may have an inner space 110 in which the plurality of filter modules 500 is disposed (or inserted). The space 110 may be formed along the traveling direction of the neutron beam, i.e., in front and rear directions, and formed corresponding to the shape of the filter module 500 (to be described later). For example, the space 110 may be shaped like a hexahedron extended in the front and rear directions. The space 110 has a front side communicating with an opening through which the target 200 enters the shielding housing 100, and a rear side communicating with the opening of the collimator 400. The shielding housing 100 may include a reflector on an exposed inner surface of the space 110. The reflector is configured to reflect the neutrons and secure the maximum amount of epithermal neutrons. For example, the reflector may contain lead, and have a density of 11.4 g/cm$^3$.

The door 120 is provided at one side of the shielding housing 100, and configured to switch over between an opened position and a closed position. When the door 120 is opened and used as an entrance through which the filter modules 500 are loaded into the space 110 or removed from the space 110. For example, the door 120 may be provided as a lateral side of the shielding housing 100. The door 120 may be configured to reciprocate between the opened position and the closed position while sliding in the frontward and backward directions. The door 120 may be formed to have one or more stepped portions in a direction facing toward the space 110. Likewise, the shielding housing 100 may be formed with one or more stepped portions in a place to be in close contact with the door 120 when the door 120 is closed, and corresponding to the stepped portion of the door 120. Therefore, radiation or neutrons released at various angles are prevented from leaking to a contact surface between the door 120 and the shielding housing 100.

Referring back to FIG. 6, the shielding housing 100 may be provided with guides 130 to or from which the plurality of filter modules 500 are mounted or removed in the frontward and rearward directions and in an orthogonal direction. The guides 130 are formed on two opposite surfaces in the space 110 and stably guide and hold the filter module 500. A plurality of guides 130 may be respectively provided to fix the mounting positions of the filter modules 500, and may be spaced apart at a predetermined distance from each other in the frontward and rearward directions. Meanwhile, the distance between the guides 130 may be formed corresponding to the thickness of the filter module 500. Therefore, when the filter modules 500 are loaded along the guides 130, the adjacent filter modules 500 are disposed to come into close contact with each other.

The guide 130 may be provided as a groove straightly formed on the inner surface of the space 110 in the shielding housing 100. The guide 130 may be provided as a groove formed having one or more stepped portions, and may for example be provided as a two-stepped groove.

Meanwhile, the filter module 500 may include one or more stepped portions at the opposite sides thereof and corresponding to the groove shape of the guide 130. The stepped portion of the filter module 500 is formed corresponding to the stepped portion of the guide 130, and it is therefore possible to minimize the leakage of the neutrons and radiation by the stepped portions engaged when the filter module 500 is mounted to the shielding housing 100.

Meanwhile, a thermal neutron filter 310 and a gamma filter 320 may be additionally provided on the traveling path of the neutrons. The thermal neutron filter 310 may be configured to filter out the thermal neutrons having an energy of 1 eV to 6 eV. For example, the thermal neutron filter 310 may contain cadmium, and have a density of 8.65 g/cm$^3$. On the other hand, the gamma filter 320 may be configured to prevent the gamma rays generated while filtering or moderating the neutrons from leaking toward the collimator 400 400. For example, the gamma filter 320 may contain bismuth, and have a density of 9.75 g/cm$^3$.

Below, the configuration of the filter module 500 will be described in detail with reference to FIGS. 7 to 9.

Figure 7:
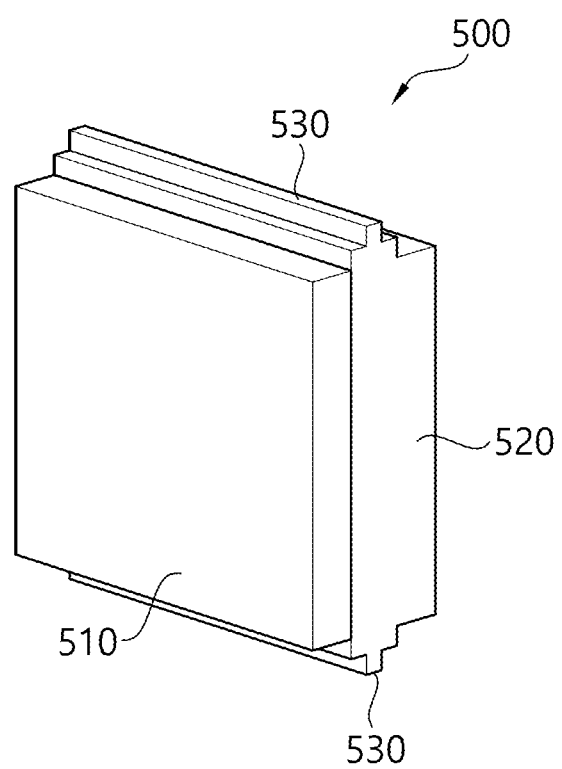
FIG. 7 is a perspective view of a filter module.
Figure 8:
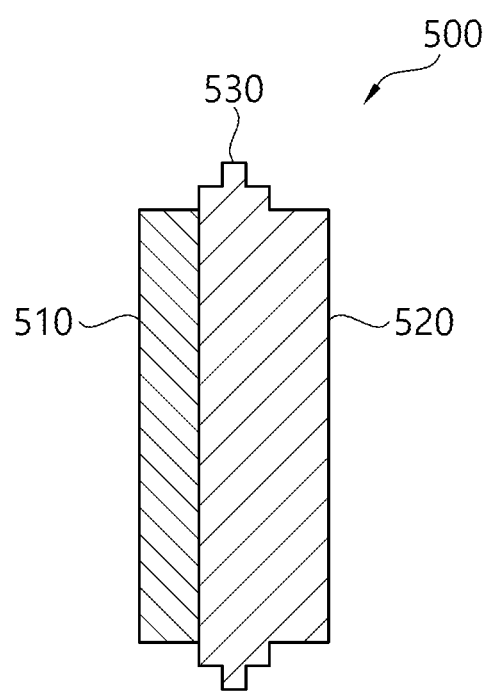
FIG. 8 is a cross-sectional view of a filter module.

FIG. 7 is a perspective view of the filter module 500, and FIG. 8 is a cross-sectional view of the filter module 500.

As shown therein, the filter module 500 may include a fast neutron filter 510, and a moderator 520. As described above, the neutrons having high energy may cause side effects during therapy, and it is therefore necessary to change the neutrons having the high energy to have properties corresponding to the energy range of the epithermal neutrons. Therefore, the plurality of filter modules 500 are provided so that the neutron beam can be changed in properties while alternately passing through the fast neutron filter 510 and the moderator 520.

The fast neutron filter 510 and the moderator 520 are shaped like plates, and are in close contact with or attached to each other in a thickness direction. Referring to FIG. 7, the orientations of the fast neutron filter 510 and the moderator 520 are set so that the neutrons can first pass through the fast neutron filter 510 and then pass through the moderator 520. In addition, the foregoing stepped portions may be formed in the moderator 520.

While the neutrons are passing through the fast neutron filter 510, some of the neutrons having high energy are changed into the neutrons having low energy. Then, the neutrons are moderated to have energy corresponding to the energy range of the epithermal neutrons while passing through the moderator 520. For example, the fast neutron filter 510 may contain iron or aluminum, and have a density of 9.75 g/cm$^3$.

The fast neutron filter 510 may be thinner than the moderator 520. For example, when the filter module 500 is formed to have a thickness of 20 mm, the fast neutron filter 510 may be formed to have a thickness of 7 mm less than half the thickness of the filter module 500, and the moderator 520 may be formed to have a thickness of 13 mm. Therefore, the ratio between the total thickness of each fast neutron filter 510 and the total thickness of each moderator 520 according to the disclosure may be similar to the ratio between the thickness of the single fast neutron filter and the single moderator used in the conventional boron neutron capture therapy apparatus.

The moderator 520 is configured to moderate the neutrons passing therethrough into the energy range of the epithermal neutrons. The moderator 520 may contain fluorine, and may include a material such as $MgF_2$, $CaF_2$, $PbF_2$, $AlF_3$, PTFE [$(CF_2)n$] and Fludental ($AlF_3$: 69%, Al:30%, LiF: 1%). For example, the moderator 520 may contain $AlF_3$, and have a density of 2.88 g/cm$^3$.

Referring back to FIG. 8, the filter module 500 may include protrusions 530 formed at upper and lower sides in directions parallel to each other and having one or more stepped portions. For example, the protrusion 530 may be provided as a two-stepped protrusion, the width and height of which correspond to those of the guide 130 of the foregoing shielding housing 100. Meanwhile, the center of the protrusion 530 may be aligned with the center of the filter module 500 in the thickness direction. When the protrusion 530 is disposed at the center of the filter module 500 in the thickness direction, the filter module 500 is stably supported and guided 130. Meanwhile, the protrusion 530 according to an embodiment may be provided in the moderator 520 thicker than the fast neutron filter 510.

Figure 9:
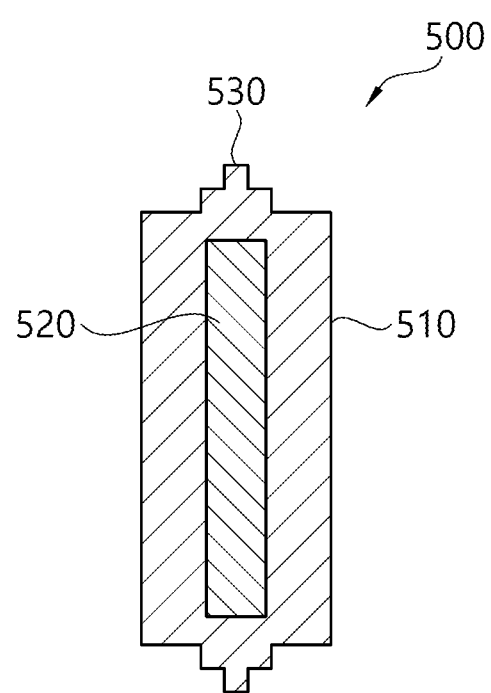
FIG. 9 is an alternative example of a filter module.

FIG. 9 is an alternative example of the filter module 500. Referring to FIG. 9, the fast neutron filter 510 and the moderator 520 are placed alternately on the traveling path of the neutron beam. As an alternative example, the fast neutron filter 510 may be placed in a center portion of the filter module 500, and the fast neutron filter 510 may be structured to surround the moderator 520. This structure is to increase durability by surrounding the moderator 520 having a relatively low hardness with the fast neutron filter 510 having a relatively high hardness. However, this structure is merely an example, and, alternatively, the fast neutron filters 510 and the moderators 520 may be alternately disposed in one filter module 500 a plurality of times.

Below, the shielding housing 100 and the therapy table 4, the positions of which are adjusted depending on the number of loaded filter modules 500, will be described with reference to FIGS. 10 and 12.

Figure 10:
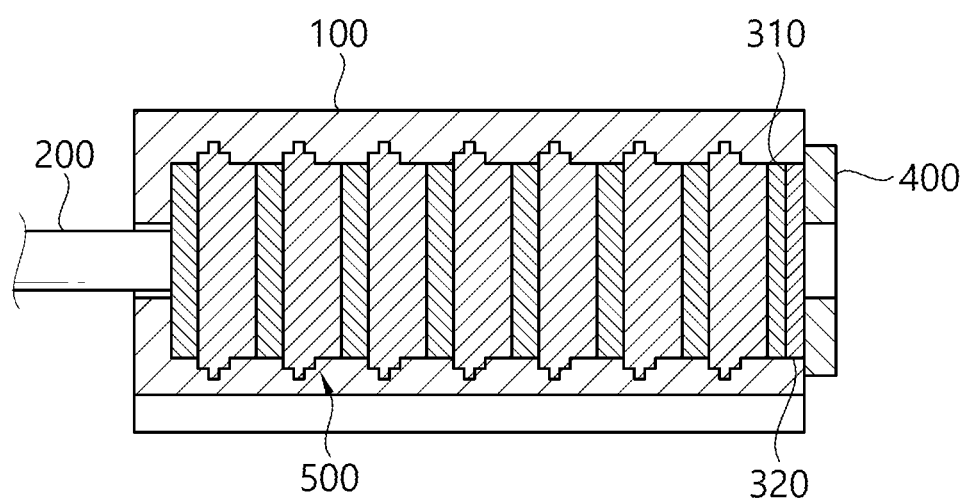
FIG. 10 is a view showing a use state of a beam shaping device.
Figure 11:
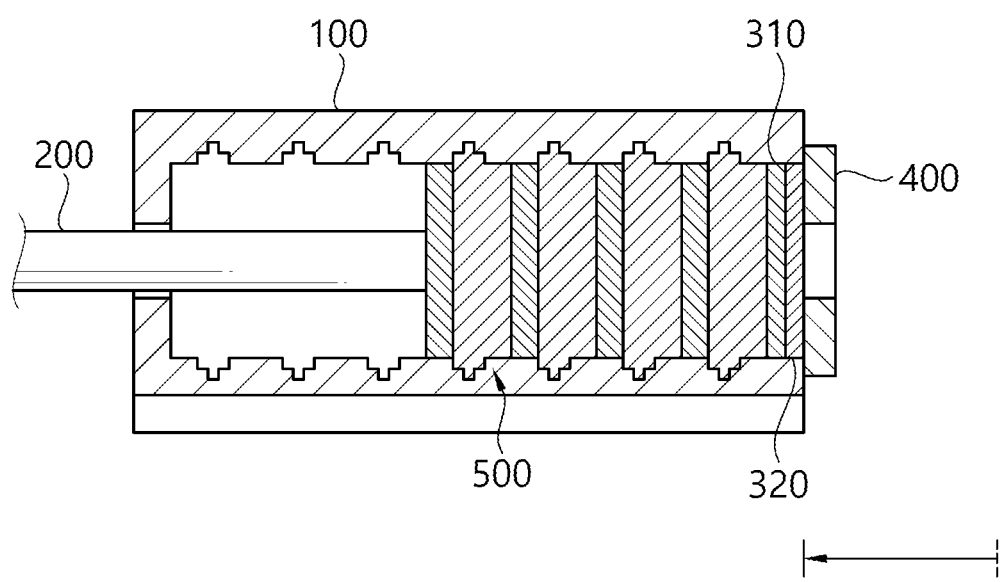
FIG. 11 is a view showing another use state of a beam shaping device.

FIG. 10 is a view showing a use state of the beam shaping device 3, and FIG. 11 is a view showing another use state of the beam shaping device 3.

Referring to FIG. 10, in the state that the shielding housing 100 is fully loaded with the filter modules 500, the target 200 may be disposed being in close contact with the frontmost filter module 500. In this case, the number of filter modules 500 may be selected so that the energy of neutrons passed through the beam shaping device 3, i.e., the energy of neutrons passed through the collimator 400 can range from 0.5 eV to 30 keV.

On the other hand, referring to FIG. 11, when the number of filter modules 500 is adjusted, i.e., when the number of filter modules 500 is reduced as compared with that of the state shown in FIG. 10, the end portion of the target 200 may be in close contact with the frontmost filter module 500 so as to minimize the exposure of the neutron beam to air in the shielding housing 100. In this case, the distance between the target 200 and the frontmost filter module 500 is adjusted by moving the shielding housing 100 because the target 200 and the accelerator are fixedly installed. In FIG. 11, the shielding housing 100 is moved frontwards to make the target 200 come into close contact with the frontmost filter module 500.

Figure 12:
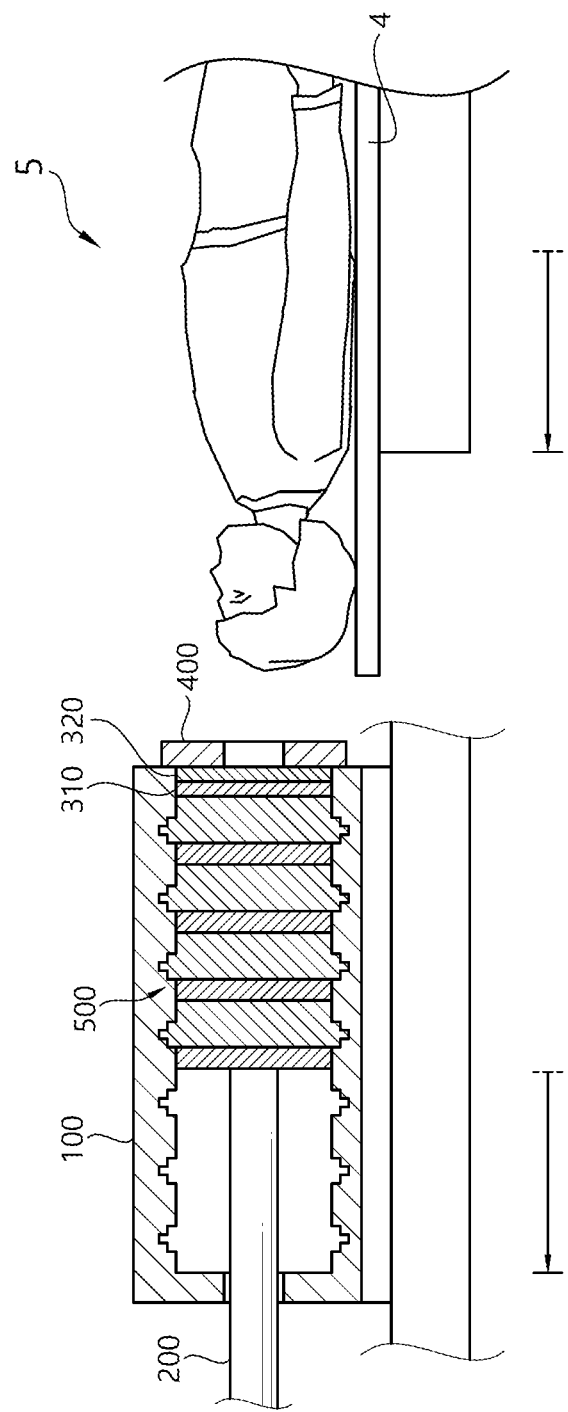
FIG. 12 is a view showing a use state of a neutron capture therapy apparatus according to the disclosure.

FIG. 12 is a view showing a use state of a neutron capture therapy apparatus according to the disclosure.

FIG. 12 illustrates that some filter modules 500 are removed to increase the energy of the neutron beam. In this case, as described above, the shielding housing 100 and the therapy table 4 are moved frontwards together by a distance corresponding to the number of removed filter modules 500. Therefore, a distance the neutron beam travels in air is constantly maintained regardless of the number of loaded filter modules 500.

Below, a function of increasing a percentage of epithermal neutrons according to the disclosure will be described with reference to FIGS. 13 and 14.

Figure 13:
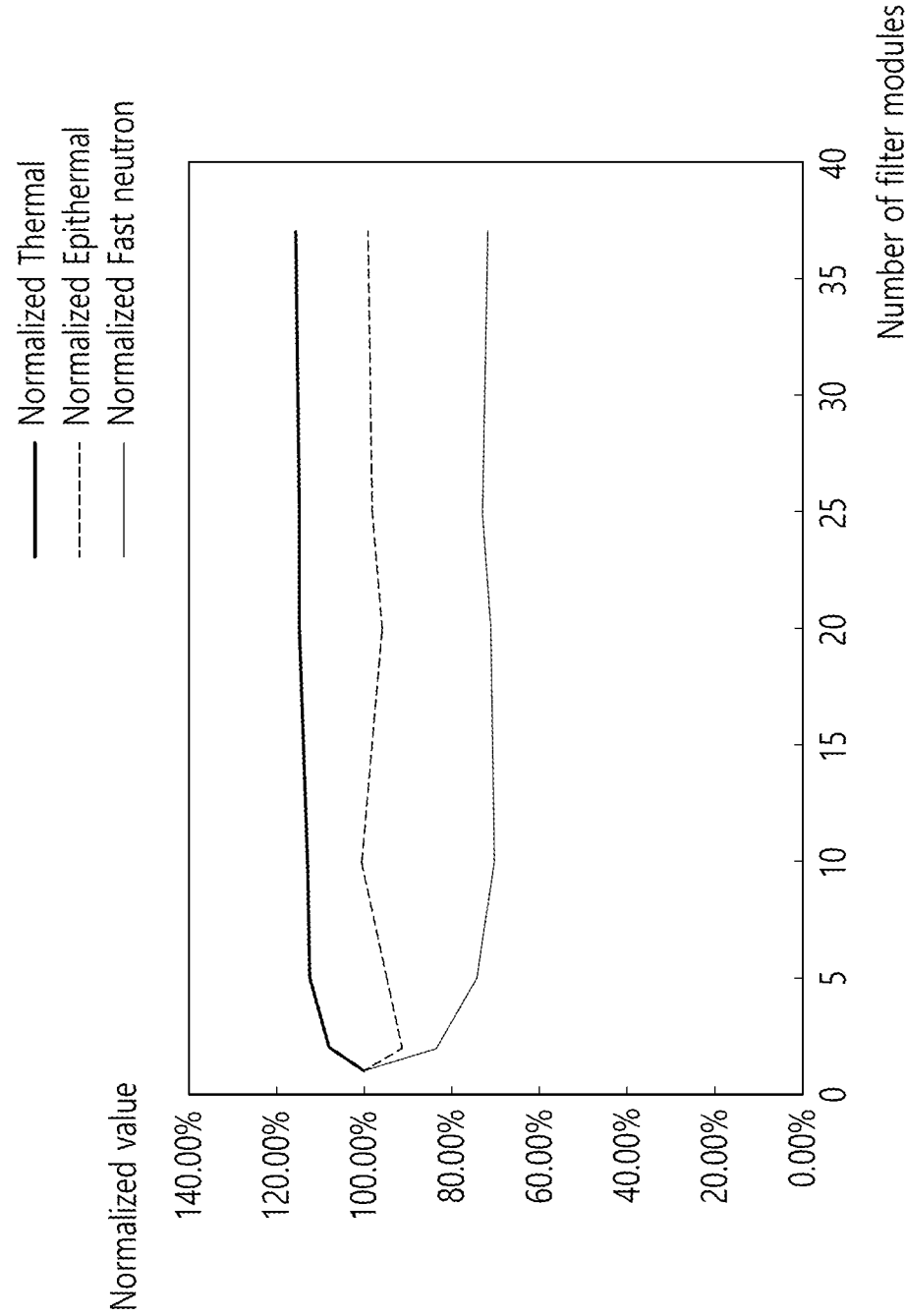
FIG. 13 is a graph showing comparison in neutron percentage between a configuration of filter modules according to the disclosure and a conventional configuration.

FIG. 13 is a graph showing comparison in neutron percentage between a configuration of the filter modules 500 according to the disclosure and a conventional configuration.

FIG. 13 shows the normalized values of fast neutrons, epithermal neutrons, and thermal neutrons when simulations are performed while increasing the filter modules 500 from 1 to 40. In FIG. 13, the distance the neutrons travel from the beam shaping device 3 is constant, and the number of filter modules 500 means the number of times the fast neutron filters 510 and the moderators 520 are alternately disposed. Meanwhile, the normalized value refers to a percentage based on a value generated when the fast neutron filter 510 and the moderator 520 are configured one by one the related art in order to compare with the related art.

Referring back to FIG. 13, as the number of filter modules 500 increases from 1 to 10, the normalized values of the fast neutrons and thermal neutrons are significantly decreased but the normalized value of the epithermal neutrons is significantly increased. Such a tendency is similarly maintained until the number of filter modules 500 increases up to 39.

Figure 14:
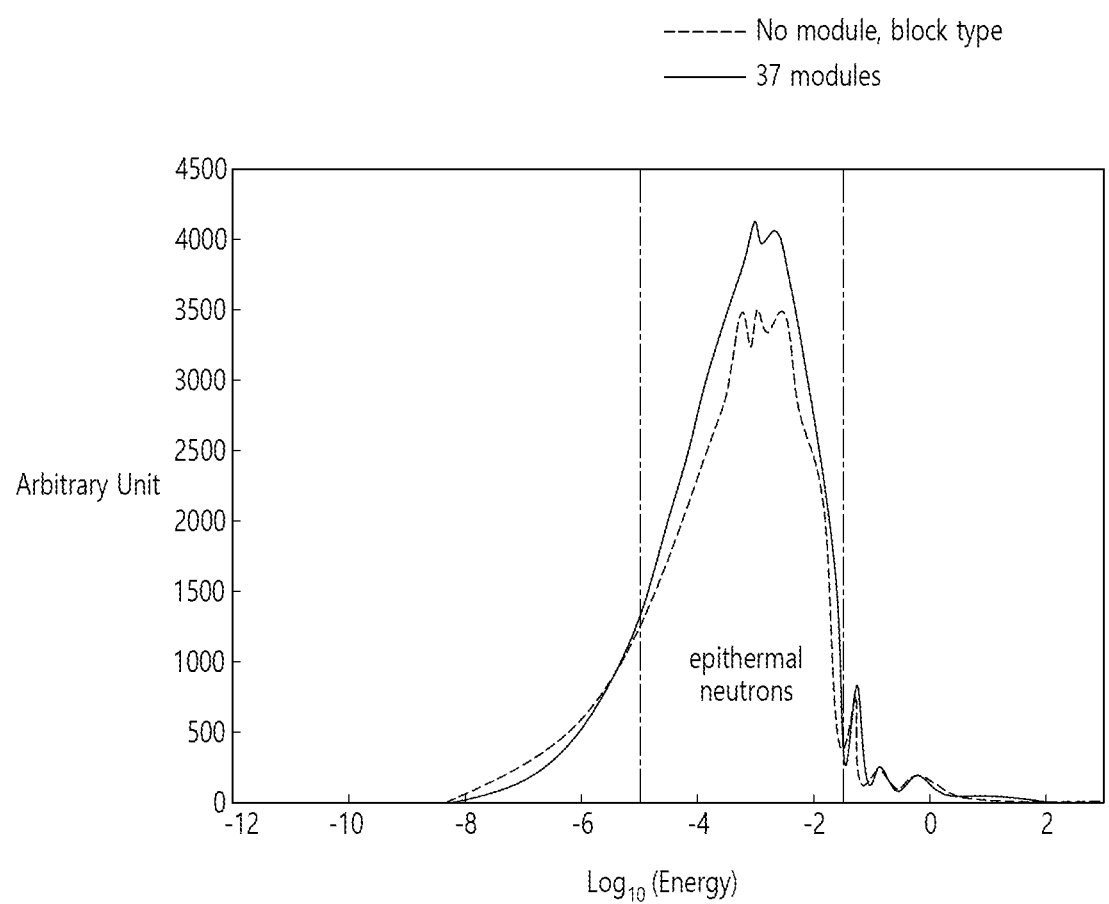
FIG. 14 is a graph showing the percentages of epithermal neutrons in a beam shaping device with 37 filter modules and a beam shaping device with no filter modules.

FIG. 14 is a graph showing the percentages of the epithermal neutrons in a beam shaping device with 37 filter modules 500 and a beam shaping device with no filter modules.

FIG. 14 shows the percentages of the neutrons according to the energy, while showing difference between a conventional simple block type and a modular type with respect to the energy area of the epithermal neutrons. As described above, the beam shaping device 3 is required to increase the percentage of the epithermal neutrons. Based on the graph, the percentage of the epithermal neutrons was increased by about 25% when the beam shaping device 3 was loaded with 37 filter modules 500 according to the disclosure as compared with the conventional single block-type beam shaping device 3.

According to the simulation results of FIGS. 13 and 14, the neutrons pass through the fast neutron filter 510 and the moderator 520 alternately a plurality of times when the plurality of filter modules 500 are provided according to the disclosure. Therefore, the properties of the neutrons are change in such a way that the neutrons having the energy range of the fast neutrons are decreased, and then the neutrons having the energy range of the epithermal neutrons are increased. In this way, the decrease in the fast neutrons and the increase in the epithermal neutrons are repeated. However, unlike the beam shaping device 3 according to the disclosure, the conventional beam shaping device 3 does not largely increase the epithermal neutrons because the neutrons pass through the fast neutron filter 510 and then pass through the moderator 520 only once.

As described above, in the beam shaping device for the boron neutron capture therapy apparatus according to the disclosure, and the boron neutron capture therapy apparatus including the same, the filter modules, the number of which is selected by a user in advance, are disposed before generating the neutrons to maximize the securing of epithermal neutrons, thereby improving a therapeutic effect and minimizing side effects during the boron neutron capture therapy.

Industrial Applicability

The disclosure is applicable to the boron neutron capture therapy apparatus, thereby having industrial applicability.

The invention claimed is:

1. A beam shaping device for a boron neutron capture therapy apparatus comprising:
   a shielding housing comprising a space formed on a traveling path of a neutron beam;
   a target provided at a front side of the shielding housing, and configured to be irradiated with a particle beam passed through an accelerator;
   a collimator provided at a rear side of the shielding housing, and configured to adjust a region through which the neutron beam passes; and
   a plurality of filter modules inserted in the space and configured to decrease the energy of the neutron beam,
   wherein each of the plurality of filter modules has a pair of main surfaces, each of the main surfaces orthogonal to a direction in which the neutron beam passes, and the plurality of filter modules are arranged along the direction in which the neutron beam passes, and the main surfaces of the plurality of filter modules are disposed in parallel with each other, and
   wherein each of the plurality of filter modules comprises a moderator and a fast neutron filter, and the moderator and the fast neutron filter are placed alternately along the traveling path of the neutron beam.

2. The beam shaping device of claim 1, wherein the filter module is shaped like a plate.

3. The beam shaping device of claim 2, wherein the filter module comprises:
   the moderator shaped like a plate, and
   the fast neutron filter formed to surround the moderator.

4. The beam shaping device of claim 3, wherein the number of filter modules to be inserted in the shielding housing is sufficient to make neutrons passed through the collimator have energy ranging from 0.5 eV to 30 keV.

5. The beam shaping device of claim 4, wherein the moderator contains $AlF_3$.

6. The beam shaping device of claim 5, wherein the fast neutron filter contains aluminum (Al).

7. The beam shaping device of claim 1, further comprising a door provided at one side of the shielding housing, and opened and closed so that the filter module can be inserted in the space.

8. The beam shaping device of claim 7, wherein the door and the shielding housing comprise stepped portions formed in portions to be in close contact with each other and configured to prevent the neutrons and gamma rays from leaking outwards.

9. The beam shaping device of claim 1, wherein
the shielding housing comprises a guide provided at a side of the space in a direction orthogonal to the direction in which the neutron beam passes, and
the filter module is inserted in the space along the guide.

10. The beam shaping device of claim 9, wherein the filter module comprises one or more first stepped portions, and the guide comprises one or more second stepped portions, the first and second stepped portions are configured to be in contact with each other.

11. The beam shaping device of claim 1,
wherein the shielding housing is movable relative to the target.

12. The beam shaping device of claim 11, wherein the shielding housing is straightly movable frontwards and rearwards.

13. The beam shaping device of claim 12, wherein
the target is configured to at least partially enter the shielding housing, and
a distance the target enters the shielding housing is determined as a horizontal moving distance of the shielding housing is adjusted according to the number of filter modules inserted in the space.

14. The beam shaping device of claim 13, wherein a position of the shielding housing is moved and determined so that an end portion of the target can be in contact with the frontmost filter module among the plurality of filter modules inserted in the space.

15. The beam shaping device of claim 14, wherein the shielding housing is configured to move together with an external therapy table configured to support a patient.

16. A boron neutron capture therapy apparatus comprising:
an accelerator configured to accelerate a particle beam;
a target configured to be irradiated with the particle beam accelerated in the accelerator and release neutrons;
a beam shaping device configured to change the properties of the neutrons; and
a therapy table configured to support a patient so that the patient can be positioned to be irradiated with the neutrons passed through the beam shaping device,
wherein the beam shaping device comprises:
a shielding housing comprising a space formed on a traveling path of the a neutron beam;
a collimator provided at a rear side of the shielding housing, and configured to adjust a region through which the neutron beam passes; and
a plurality of filter modules inserted in the space and configured to decrease the energy of the neutron beam,
wherein each of the plurality of filter modules has a pair of main surfaces, each of the main surfaces orthogonal to a direction in which the neutron beam passes, and the plurality of filter modules are arranged along the direction in which the neutron beam passes, and the main surfaces of the plurality of filter modules are disposed in parallel with each other, and
wherein each of the plurality of filter modules comprises a moderator and a fast neutron filter, and the moderator and the fast neutron filter are placed alternately along the traveling path of the neutron beam.

17. A boron neutron capture therapy apparatus comprising:
an accelerator configured to accelerate a particle beam;
a target configured to be irradiated with the particle beam accelerated in the accelerator and release neutrons;
a beam shaping device configured to change the properties of the neutrons; and
a therapy table configured to support a patient so that the patient can be positioned to be irradiated with the neutrons passed through the beam shaping device,
wherein the beam shaping device comprises:
a shielding housing comprising a space formed on a traveling path of a neutron beam;
a collimator provided at a rear side of the shielding housing, and configured to adjust a region through which the neutron beam passes; and
a plurality of filter modules inserted in the space and configured to decrease the energy of the neutron beam,
wherein each of the plurality of filter modules comprises a moderator and a fast neutron filter, and the moderator and the fast neutron filter are placed alternately along the traveling path of the neutron beam.

* * * * *